United States Patent [19]
Wallace

[11] Patent Number: 5,355,224
[45] Date of Patent: Oct. 11, 1994

[54] APPARATUS INCLUDING A MANGIN MIRROR FOR SUPERIMPOSING VARIABLE GRAPHICAL AND ALPHANUMERIC INFORMATION ONTO THE IMAGE PLANE OF AN OPTICAL VIEWING DEVICE

[75] Inventor: Robert E. Wallace, Garland, Tex.

[73] Assignee: Varo Inc., Garland, Tex.

[21] Appl. No.: 945,680

[22] Filed: Sep. 16, 1992

[51] Int. Cl.[5] ............ G02B 27/10; G02B 7/18; G02B 23/12; G02B 27/32

[52] U.S. Cl. ............ 359/631; 359/634; 359/351; 359/400; 359/727

[58] Field of Search ............ 359/631, 630, 634, 637, 359/351, 400, 353, 727, 728

[56] References Cited
U.S. PATENT DOCUMENTS

| | | | |
|---|---|---|---|
| 3,645,635 | 2/1972 | Steck | 356/252 |
| 3,994,597 | 11/1976 | Calder et al. | 356/251 |
| 4,000,419 | 12/1976 | Crost et al. | 250/213 |
| 4,012,123 | 3/1977 | Fuller | 350/174 |
| 4,361,384 | 11/1982 | Bosserman | 359/630 |
| 4,417,814 | 11/1983 | Doliber | 356/252 |
| 4,591,987 | 5/1986 | Brown | 364/458 |
| 4,658,139 | 4/1987 | Brennan et al. | 250/330 |
| 4,671,165 | 6/1987 | Heidmann et al. | 89/41.19 |
| 4,716,429 | 12/1987 | Misawa | 354/409 |
| 4,818,065 | 4/1989 | Ziph et al. | 350/174 |
| 4,915,487 | 4/1990 | Riddell, III et al. | 350/174 |
| 4,961,626 | 10/1990 | Fournier, Jr. et al. | 350/174 |
| 4,965,439 | 10/1990 | Moore | 235/404 |
| 5,001,786 | 3/1991 | Copeland | 2/424 |
| 5,033,818 | 7/1991 | Barr | 350/174 |
| 5,046,260 | 9/1991 | Wellhausen | 33/356 |

FOREIGN PATENT DOCUMENTS 0380035  1/1990  European Pat. Off. .

Primary Examiner—Jon W. Henry
Attorney, Agent, or Firm—Baker & Botts

[57] ABSTRACT

There is provided an improved optical viewing device (10) in which variable compass heading information (80) and stadiametric range measuring information (88), (106), (118) is superimposed upon the image of a scene viewed through a viewing optical system (13) within the device (10). A self-luminous display panel (36) displays the information in the form of graphical symbols and/or alphanumeric characters. A folding lens (38) reflects light from the display panel (36) to a correcting lens (40), which transmits the light to a reflecting means (41) or (52). The reflecting means (41) or (52) reflects the light to a mangin mirror (44) or (62), which reflects the light to a dichroic combiner (28) or (50). The dichroic combiner (28) or (50) transmits the light into the path of the viewing optical system (13) such that the information displayed on the display panel (36) is effectively superimposed upon the image of the scene viewed by the user. A dichroic coating on dichroic combiner (28) or (50) reflects light of wavelengths associated with the viewing optical system (13) and transmits light associated with the illuminated display panel (36). An alternative embodiment employs a holographic element (72) to superimpose the information from display panel (36) upon the image of the scene.

2 Claims, 5 Drawing Sheets

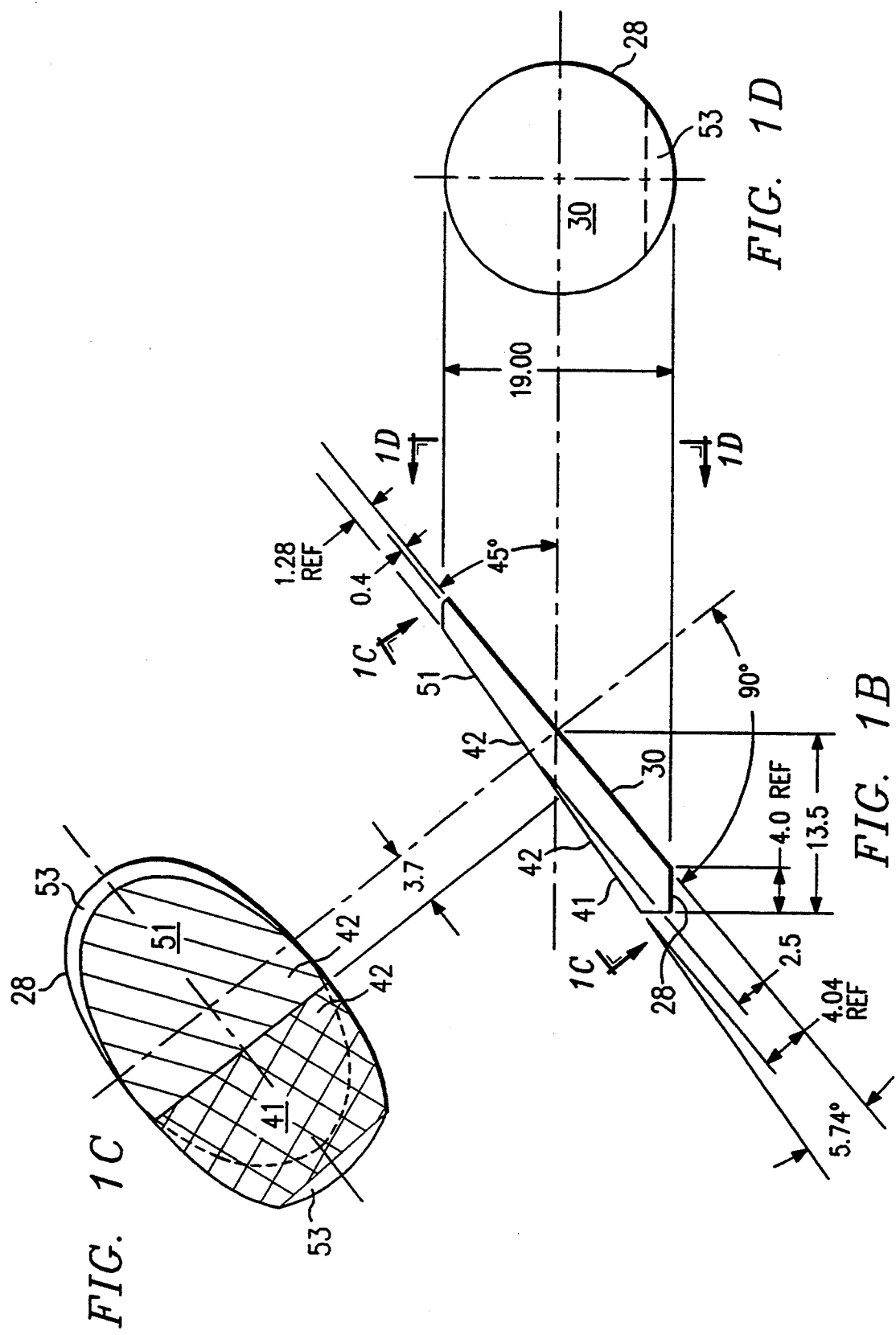

APPARATUS INCLUDING A MANGIN MIRROR FOR SUPERIMPOSING VARIABLE GRAPHICAL AND ALPHANUMERIC INFORMATION ONTO THE IMAGE PLANE OF AN OPTICAL VIEWING DEVICE

CROSS REFERENCE TO RELATED APPLICATION

This application is related to U.S. application Ser. No. 945,741 entitled VARIABLE COMPASS HEADING AND STADIAMETRIC RANGING DISPLAY IN AN OPTICAL VIEWING DEVICE, filed of even date herewith.

TECHNICAL FIELD OF THE INVENTION

The present invention relates to optical systems and methods and, more particularly, to a refracting/reflecting optical system and method which enables variable data such as compass heading information and stadiametric range measuring indicia to be superimposed upon the image of a scene viewed by a user.

BACKGROUND OF THE INVENTION

Prior techniques have been developed for displaying information in the field of view of binoculars, night vision goggles, weapon sights, and similar hand-held or helmet mounted optical viewing devices. One prior technique utilized a fixed reticle imposed in the optical path which would appear to the eye of the viewer. Such a fixed reticle could be permanently etched on a lens surface, for example. Alternatively, the reticle might comprise a wire or small symbol implanted in the optical path. A disadvantage with such a fixed reticle is that the etched or implanted indicia is always visible to the viewer and cannot be readily removed when it is not desired to use the indicia. In addition, the use of such fixed reticle has heretofore obscured the field of view and the actual scene being viewed. Finally, the displayed indicia could not be readily changed or varied by the user.

Another prior art technique is the use of a light emitting diode (LED) which is implanted within the optical system. When energized, the LED causes a small, illuminated dot to be displayed to the viewer. The illuminated dot might indicate, for example, the energization of a particular feature of the optical viewing device. The LED display, unlike the fixed reticle discussed above, could be de-energized and removed from the field of view when not needed or wanted. However, the LED display still suffers the disadvantage of being unable to display changing or variable information.

Other prior techniques have included "heads up" displays for pilots of aircraft wherein information is displayed adjacent to the windshield of the aircraft, or, in some instances, through a viewer worn by the pilot. However, these techniques have not been used in conjunction with self contained optical viewing devices because the apparatus required is quite large and cannot be reduced in size sufficiently to be packaged in a handheld or helmet mounted optical viewing device. Similarly, the automotive industry uses a projection device to display the speed of an automobile on the windshield. However, this device is also much too large and impractical for implementation in an optical viewing device such as a night vision goggle or binocular viewer.

One particularly useful type of information which would be desirable to display in the field of view of an optical viewing device, such as a night vision goggle or binocular, is a compass heading. Compass heading information viewable through a night vision goggle would be especially useful, because at night a goggle user would be unable to obtain his geographical orientation from the location of the sun, and because it is impractical and inconvenient to remove a helmet-mounted night vision goggle to refer to a handheld, magnetic compass.

Electronic compasses which generate digital representations of compass headings are in the prior art. Some of the uses of these compasses have been within automobiles. An example of such an electronic compass is disclosed in U.S. Pat. No. 5,046,260 issued to Wellhausen on Sep. 10, 1991. However, previous electronic compasses have been relatively bulky and too large to incorporate in small optical viewing devices. In addition, there have been no previously known practical techniques for selectively projecting the output from an electronic compass into the optical path of an optical viewing device so that the user could selectively view the field of view while simultaneously viewing compass heading.

Another useful type of information for displaying in the field of view of an optical viewing device is stadiametric ranging information. This information is particularly useful to a foot soldier using a binocular or a night vision goggle in a combat situation. The soldier could use measuring indicia within the field of view of his goggle to quickly determine his approximate distance from an enemy soldier or tank, for example.

Stadiametric ranging has been heretofore provided to the user of a weapon sight through the use of a fixed reticle projected through the image tube and displayed to the viewer of the weapon sight. However, fixed reticle ranging displays are undesirable because they cannot be removed from the field of view when not needed, and therefore would tend to obstruct the vision of the user when it is not necessary to have the range information displayed. In addition, it is difficult to provide a fixed reticle in a two tube night vision goggle.

Consequently, a need exists for an improved optical viewing device in which variable information, such as compass heading and/or stadiametric range determining information, can be selectively optically overlaid or superimposed upon the image of a scene viewed through the device. Preferably, the superimposed information would be selectively presented or removed by the user so as not to interfere with the user's vision when the information is not needed. Also, in devices such as night vision goggles in which the image of a scene is typically presented to the user in a monochrome color, the superimposed information will preferably be displayed in a contrasting color for improved readability

SUMMARY OF THE INVENTION

An improved optical system for use in a viewing device having a housing and a viewing optical system supported within the housing for permitting a user to view an image of a scene. The improved optical system comprises a display panel, a correcting lens, a mangin mirror, reflecting means, and a dichroic combiner. The display panel is supported within the housing for visually displaying information when illuminated. The correcting lens is supported within the housing and disposed in optical proximity to the display panel. The reflecting means is supported within the housing and disposed in optical proximity to the correcting lens and the mangin mirror. The dichroic combiner is supported within the housing and disposed in optical proximity to the mangin mirror. The dichroic combiner has a surface which reflects light of wavelengths associated with the viewing optical system and which transmits light of wavelengths associated with the illuminated display panel, whereby the correcting lens transmits light from the illuminated display panel to the reflecting means, the reflecting means reflects the light from the correcting lens to the mangin mirror, the mangin mirror reflects the light from the reflecting means to the dichroic combiner, and the dichroic combiner transmits the light into the path of the viewing optical system such that the information displayed on the display panel is effectively superimposed upon the image of the scene viewed by the user.

BRIEF DESCRIPTION OF THE DRAWINGS

FIG. 1B is a side elevation view of the dichroic combiner 28 of FIG. 1A.

FIG. 1C is a front elevation view of the dichroic combiner 28 of FIG. 1B, taken along line 1C—1C in FIG. 1B.

FIG. 1D is an oblique rear elevation view of the dichroic combiner 28 of FIG. 1B, taken along line 1D—1D in FIG. 1B.

DETAILED DESCRIPTION OF THE INVENTION

Figure 1A:
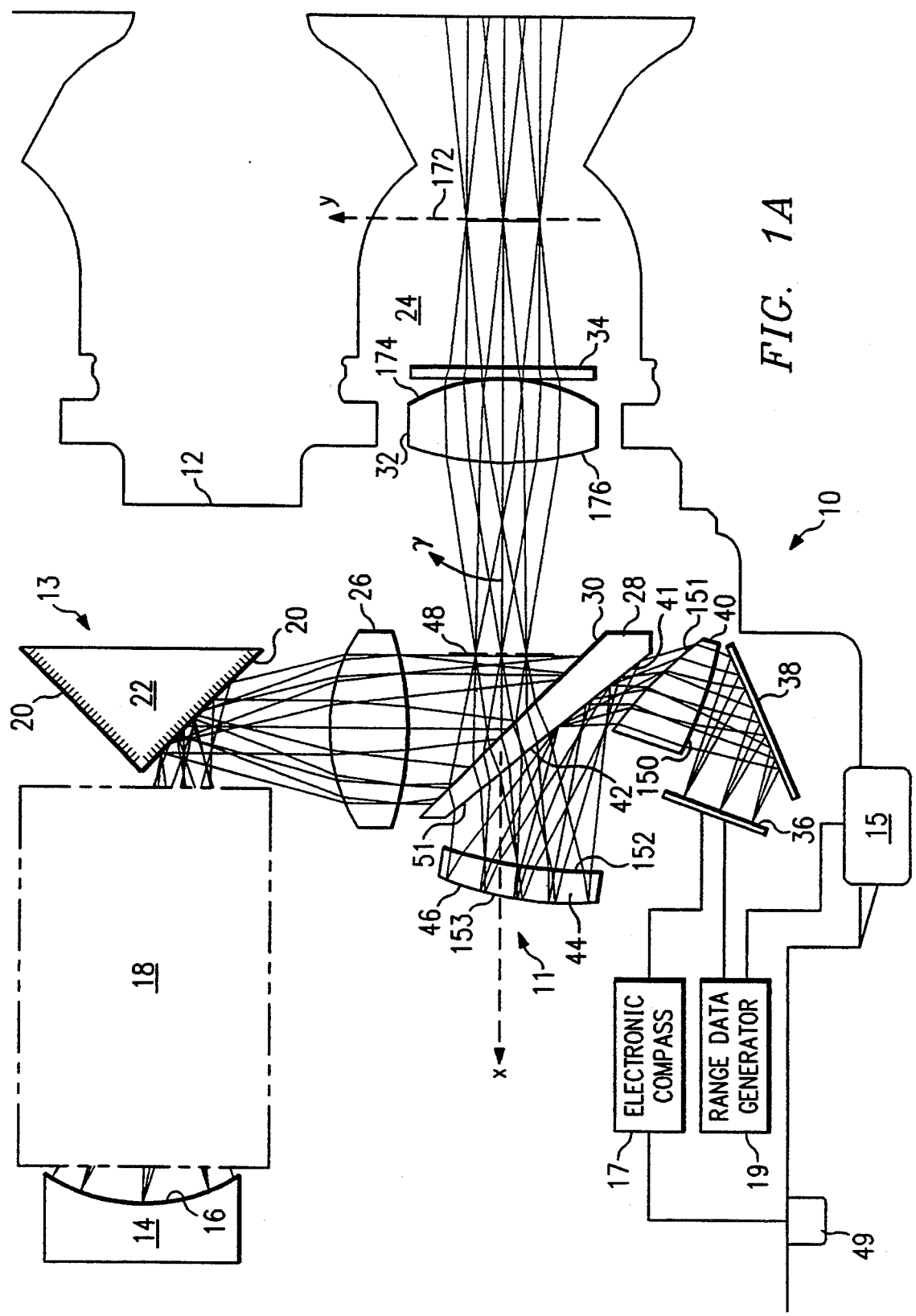
FIG. 1A is a fragmentary, cross-sectional view of a night vision goggle 10 having an information display optical system 11 according to a first embodiment of the present invention, illustrating the paths of representative light rays through the optical components.

The preferred embodiments of the present invention and its advantages are best understood by referring to the drawings, like numerals being used for like and corresponding parts of the various drawings.

Referring now to the drawings, and more particularly to FIG. 1, there is shown an enlarged, fragmentary, cross-sectional view of a night vision goggle, generally designated 10, having an information display optical system, generally designated 11, which incorporates the first embodiment of the present invention. Although the invention is illustrated herein as it might be embodied in the optical system of a night vision goggle, it is to be understood that the invention described and claimed herein is equally adaptable to other optical viewing devices, such as binocular viewers, weapon sights, and the like.

As illustrated in FIG. 1, night vision goggle 10 comprises a housing 12 which is supported in the conventional manner on the head of the viewer by a headgear. Housing 12 contains or supports a viewing optical system, generally designated 13, and an information display optical system 11 of this invention. Viewing optical system 13 permits the user of goggle 10 to view an intensified image of a night scene. Information display optical system 11 permits visual data, such as alphanumeric and/or graphical information, to be superimposed upon the image of the night scene viewed by the user. Thus, the combination of systems 11 and 13 permits the user to simultaneously view the scene and the superimposed data.

This invention provides for two types of illuminated data or information to be selectively viewed by the user of goggle 10. The first type of data is compass heading information responsive to an electronic compass 17 attached to goggle housing 12. An example of an electronic compass 17 suitable for use in this invention is that disclosed in U.S. Pat. No. 5,046,260 issued to Wellhausen on Sep. 10, 1991, incorporated herein by reference. The second type of information which may be selectively viewed by the user is stadiametric ranging information in response to a range data generator 19 attached to goggle housing 12. As will be described more fully hereinafter, the range data generator 19 causes one of several range measuring indicia and numeric range figures to be viewed in response to the position of a knob operated, multi-position switch 15 attached to housing 12.

Although the types of information illustrated herein are compass heading and stadiametric ranging information, it is to be understood that this invention is not limited in scope to only these types of information. Other variable information or data, for example, a user's geographical coordinates transmitted from a satellite to a receiver in goggle 10, could also be selectively viewed by the apparatus and method of this invention.

Viewing optical system 13 includes an image intensifier device or tube 14, which collects low intensity light from a scene viewed through the night vision goggle and produces an intensified image of the scene on its output screen 16. A collimator assembly 18 receives and collimates the intensified light emitted by output screen 16 of image intensifier tube 14. Collimators are well known in the art, therefore the components of collimator assembly 18 are not specifically illustrated in FIG. 1. The collimated light from collimator assembly 18 is split by mirrors 20 of splitter member 22 into two oppositely directed paths, one for each eyepiece 24 of the goggle. The light reflected into each eyepiece 24 is refracted and transmitted by lens 26 to a dichroic combiner 28.

An important aspect of this invention resides in the dichroic coating 30 on dichroic combiner 28. Dichroic coating 30 reflects light of wavelengths associated with viewing optical system 13, and transmits light of wavelengths associated with information display optical system 11. Dichroic coating 30 preferably has a minimum transmission at 45° incidence of 85 percent at 650 to 680 nm frequency range, and a minimum reflectance of 95 percent at 420 to 600 nm frequency range. Dichroic coatings suitable for this application are well known in the art, and are commercially available. Dichroic combiner 28 reflects the light from lens 26 to eyepiece lens 32. Eyepiece lens 32 refracts and transmits the intensified light through a protective window 34 to the eyes of the user.

Information display optical system 11 comprises one or more visual data generating devices, such as electronic compass 17 and range data generator 19, and a self-luminous display panel 36 mounted within housing 12. Display panel 36 includes an array of light emitting diodes (LEDs) (not illustrated) which emit preferably red light when electrically energized by a power supply or transducer (not illustrated). Display panel 36 also includes appropriately configured masks or opaque overlays (not illustrated) that are disposed over the LEDs so that alphanumeric and/or graphical information is self-illuminated on display panel 36 when the light emitting diodes are energized. Techniques for displaying alphanumeric and/or graphical information by configuring masks over light emitting diodes are well known in the art, and need not be described in detail here.

Although a self-luminous display panel comprising red LEDs is illustrated herein with respect to each of the embodiments of this invention, it is to be understood that other self-luminous or externally illuminated display devices may also be used in this invention. Examples of alternative display devices which may be used include a cathode ray tube (CRT), a vacuum florescent display (VFD), and an electroluminescent display (ELD). The term "illuminated" as used herein and in the appended claims should be construed to include both self-luminous and externally illuminated displays and/or data.

Light from illuminated display panel 36 is reflected by folding mirror 38 to correcting lens 40. Correcting lens 40 refracts and transmits the light received from folding mirror 38 to a mirror coating 41 over the lower portion of surface 42 of dichroic combiner 28. Mirror coating 41 preferably has a minimum reflectance at 58° incidence of 94 percent at 430 to 620 nm frequency range. Mirror coating 41 on dichroic combiner 28 reflects the light to mangin mirror 44.

Mangin mirrors are well known in the optics art, and comprise a negative meniscus lens having a rear surface 46 that is mirror coated. The mirror coating on mangin mirror 44 acts as a spherical mirror, while the lens component of mangin mirror 44 corrects for spherical aberration produced by the spherical mirror. Mirror 44 should preferably be a mangin mirror rather than a flat mirror in order to produce a focused image of the information displayed on display panel 36 at the image plane 48 of viewing optical system 13.

The light is reflected by mangin mirror 44 to an antireflection coating 51 over the upper, non-mirror coated portion of surface 42 of dichroic combiner 28. Antireflection coating 51 preferably has a maximum reflectance of 0.5 percent at 600 to 700 nm frequency range. The light from mangin mirror 44 is refracted by dichroic combiner 28, and transmitted through dichroic coating 30 of dichroic combiner 28 into the path of viewing optical system 13 such that the information displayed on display panel 36 is effectively superimposed upon the intensified image of the scene viewed by the user of night vision goggle 10. It should be noted that both the image of the scene transmitted by viewing optical system 13 and the illuminated information transmitted by information display optical system 11 are simultaneously focused at a common image plane 48.

The output screen 16 of image intensifier tube 14 produces an image of the viewed scene which is characterized by a green color. The green color is an inherent characteristic of images produced by commercially available image intensifier tubes and devices. Dichroic coating 30 of dichroic combiner 28 is selected to reflect the green light from output screen 16 and to transmit the red light produced by the light emitting diodes of display panel 36. Thus, the information from display panel 36 is superimposed in red color upon the green image of the scene viewed by the user, providing optimum color contrast for the superimposed information.

Alternatively, if information display optical system 11 of the present invention is incorporated into a binocular viewer or other optical viewing device which produces an image of a scene characterized by white light, a dichroic coating 30 will be selected for combiner 28 which reflects light of substantially all wavelengths except red, and which transmits red light associated with illuminated display panel 36.

Table I lists the preferred lens prescription and mounting distance data for the components of information display optical system 11 of FIG. 1. Listed in order from left to right are: (1) the lens surface number; (2) the radius of curvature of the surface (mm) (positive (+) radii for centers of curvature to right of lens surface, and negative (−) radii for centers to left of lens surface); (3) kappa (the conic constant); (4) and (5) the x and y coordinates, respectively, of axial center of surface with respect to center of exit pupil; (6) the tilt angle γ of the surface (positive (+) angles measured counterclockwise from x axis); (7) the lens material; and (8) the clear aperture radius of lens (mm).

TABLE I

| Lens Surface No. | Radius of Curvature (mm) | KAPPA | X | Y | γ (degrees) | Material | Clear Aperture Radius (mm) |
|---|---|---|---|---|---|---|---|
| 172 (exit pupil) | ∞ | 0 | 0 | 0 | 0 | Air | 3.5 |
| 174 | 15.33 | −1.645 | 15 | 0 | 0 | Acrylic | 8.5 |
| 176 | −24.74 | −2.58 | 22.62 | 0 | 0 | Air | 8.5 |
| 30 | ∞ | 0 | 47.33 | 0 | 45° | BK7 | 27.0 |
| 42 | ∞ | 0 | 49.09 | 1.77 | 39.26° | Air | 27.0 |
| 152 | −40.41 | 0 | 58.9 | 1.89 | 8.39° | BK10 | 7.2 |
| 153 | −32.98 | 0 | 61.81 | 1.46 | 8.39° | Mirror | 7.2 |
| 151 | 68.60 | 0 | 51.02 | 5.09 | 47.38° | LAF21 | 18.0 |
| 150 | −53.27 | 0 | 65.51 | 10.50 | 47.38° | Air | 18.0 |

TABLE I-continued

| Lens Surface No. | Radius of Curvature (mm) | KAPPA | X | Y | γ (degrees) | Material | Clear Aperture Radius (mm) |
|---|---|---|---|---|---|---|---|
| 36 | ∞ | 0 | 48.16 | 32.19 | 54.63° | Air | 3.4 |

Referring now to FIGS. 1B, 1C, and 1D, there are shown the preferred dimensions for dichroic combiner 28, and for mirror coating 41 and anti-reflection coating 51 on surface 42 of combiner 28. All dimensions are in millimeters. Dichroic coating 30, mirror coating 41, and anti-reflection coating 51 are polished to test plate fit for a maximum of 4 fringes for power and 1 fringe for irregularity. Surfaces 53 in FIGS. 1C and 1D are preferably fine ground; and all other surfaces preferably have a cosmetic surface quality of 60/40 (scratches/ digs).

Switch 49 attached to housing 12 is electrically connected to electronic compass 17 for selectively energizing or deenergizing electronic compass 17 from a power supply, such as a battery (not shown). Switch 15 is electrically connected to range data generator 19 for selectively energizing or deenergizing range generator 19 from the power supply (not shown). Widen switch 49 is selectively turned on so as to energize the electronic compass 17, compass heading information is displayed on display panel 36 and superimposed upon the image of the scene viewed by the user of night vision goggle 10. When switch 15 is selectively rotated to a first "on" position to energize range data generator 19, stadiametric ranging information is displayed on display panel 36 and superimposed upon the image of the scene viewed by the user. Both compass heading information from electronic compass 17 and stadiametric ranging information from range data generator 19 may be viewed simultaneously with the image of the scene by turning on both switches 49 and 15. Although separate switches 49 and 15 are described herein, it is to be understood that a single multi-position switch may alternatively be used instead of separate switches 49 and 15.

Figure 2:
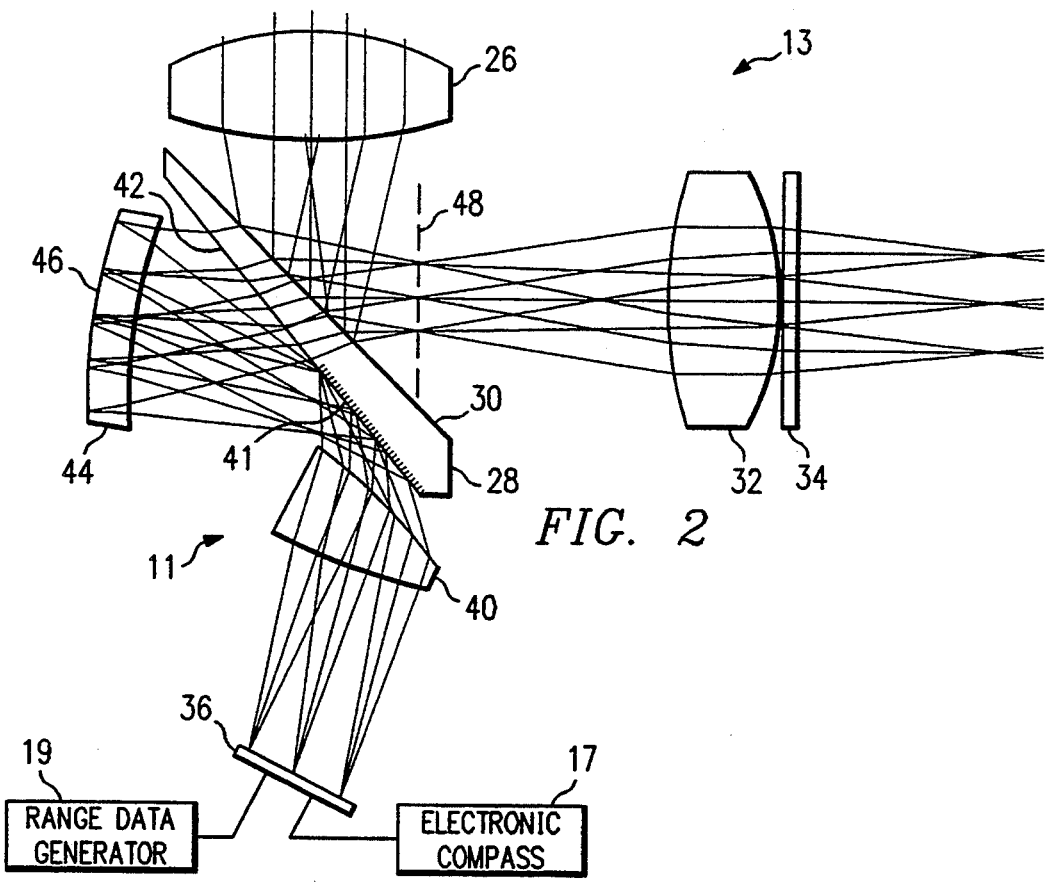
FIG. 2 is a modified optical component layout view of the afocal relay portion of the goggle 10 of FIG. 1, with folding mirror 38 omitted in the layout of FIG. 2.
Figure 3:
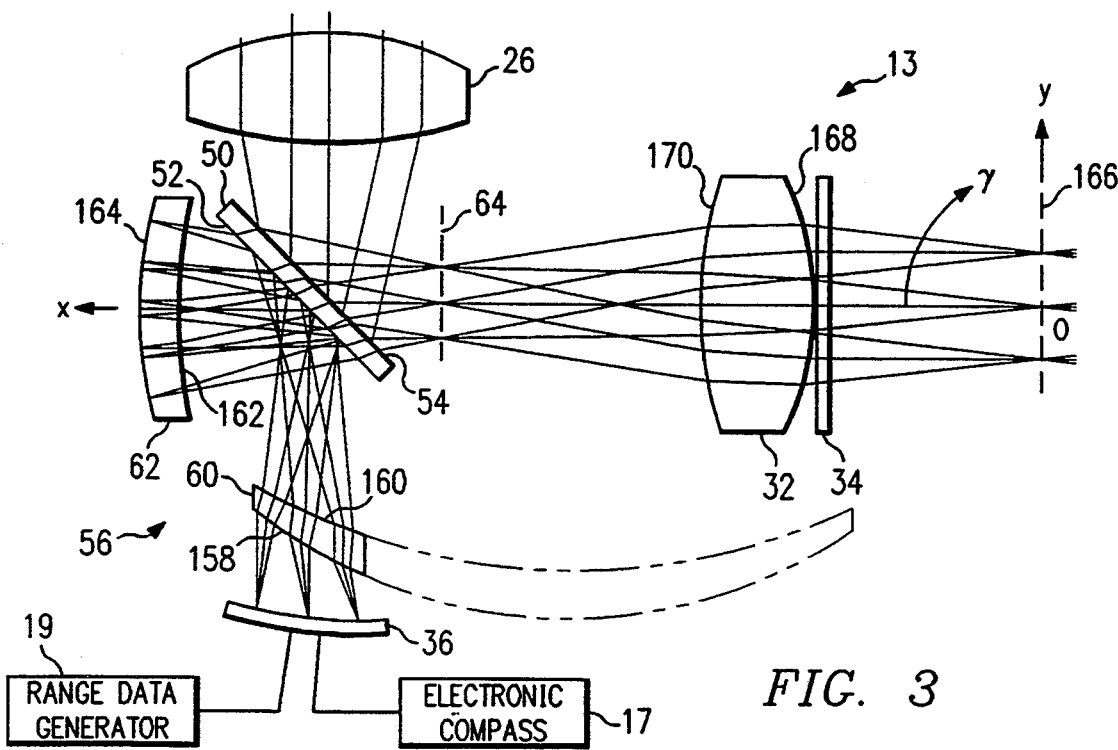
FIG. 3 is an optical component layout view of the afocal relay portion of a night vision goggle 10 having an information display optical system 56 according to a second embodiment of the present invention, illustrating the paths of representative light rays through the optical components.
Figure 4:
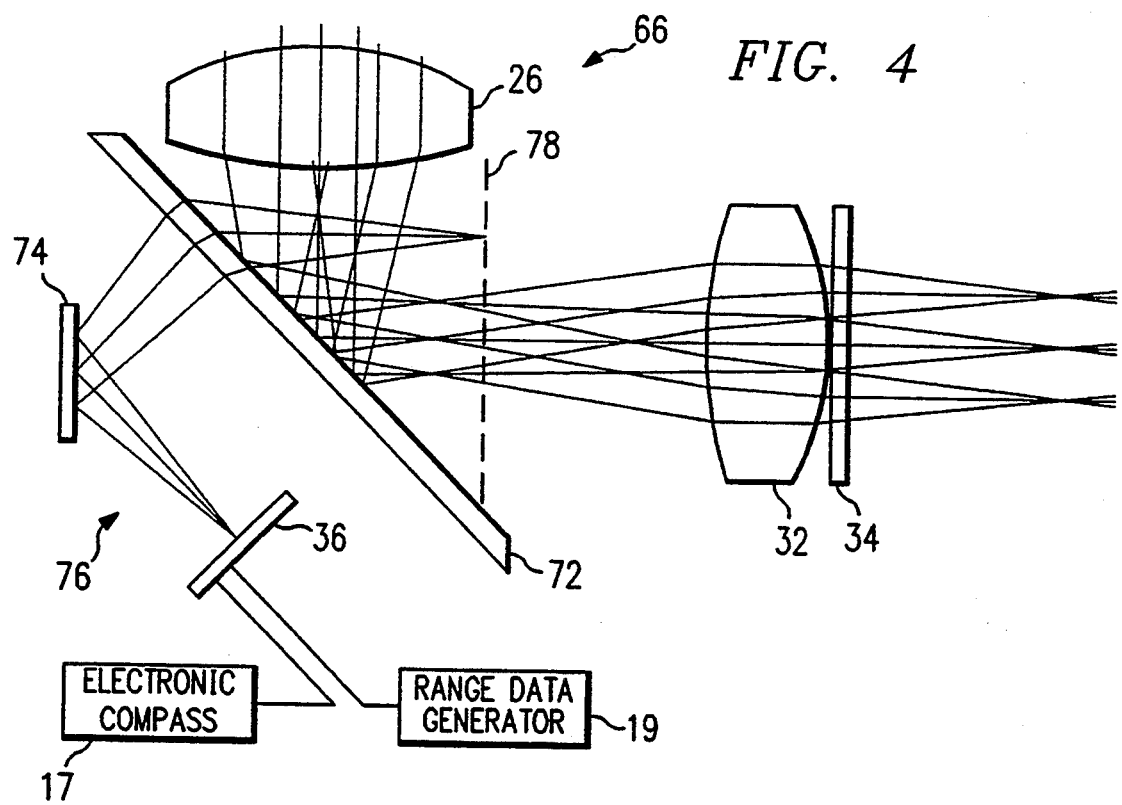
FIG. 4 is an optical component layout view of the afocal relay portion of a night vision goggle 10 having an information display optical system 76 according to a third embodiment of the present invention, illustrating the paths of representative light rays through the optical components.

Additional embodiments of information display optical system 11 of the present invention are illustrated in FIGS. 2-4 of the drawings. Because image intensifier tube 14, collimator assembly 18, and splitter member 22 of viewing optical system 13 are essentially the same in all illustrated embodiments, these components are omitted from FIGS. 2-4, and only the remaining optical components, comprising the afocal relay portion of the goggle, are shown.

Referring now to FIG. 2, there is shown the afocal relay portion of the goggle of FIG. 1, with folding mirror 38 omitted as an optical component. As seen from a comparison of FIG. 2 with FIG. 1, the omission of folding mirror 38 requires that display panel 36 be located substantially farther from correcting lens 40 than is required when folding mirror 38 is used. Therefore, the embodiment illustrated in FIG. 1 is preferred when information display optical system 11 must be contained within a compact housing 12.

Referring now to FIG. 3, there is shown an optical component layout view for the afocal relay portion of a night vision goggle having an information display optical system 56 according to a second embodiment of the present invention. As seen, dichroic combiner 50 Of the second embodiment has a flat shape with parallel opposite surfaces 52 and 54. Dichroic combiner 50 also differs from dichroic combiner 28 of the first embodiment in that dichroic combiner 50 has a half-silvered mirror or 50/50 beamsplitter coating on surface 52, rather than being partially mirror coated and partially uncoated. A beamsplitter coating is used on surface 52 of dichroic combiner 50 for reasons that will be explained hereinafter. Beamsplitter coatings suitable for this application are well known in the art, and are commercially available. Opposite surface 54 of dichroic combiner 50 is coated with a dichroic coating substantially similar to that described above with reference to FIG. 1.

Information display optical system 56 of the second embodiment comprises a self-luminous display panel 36, as described above with reference to FIG. 1. Light from illuminated display panel 36 is received by correcting lens 60, which refracts and transmits the light to surface 52 of dichroic combiner 50. The light from correcting lens 60 is partially reflected by the beamsplitter coating to mangin mirror 62. Mangin mirror 62, which is substantially similar to mangin mirror 44 described above with reference to FIG. 1, refracts and reflects the light back to beamsplitter coated surface 52 of dichroic combiner 50. Beamsplitter coated surface 52 partially transmits the light through dichroic combiner 50 into the path of the viewing optical system 13, such that the information displayed on display panel 36 is effectively superimposed upon the intensified image of the scene viewed by the user. As with the first embodiment described above with reference to FIG. 1, the illuminated information transmitted by information display optical system 56 and the image of the scene transmitted by viewing optical system 13 are simultaneously focused at a common image plane 64.

Table II lists the preferred lens prescription and mounting distance data for the components of information display optical system 56 of FIG. 3. Listed in order from left to right are: (1) the lens surface number; (2) the radius of curvature of the surface (mm) (positive (+) radii for centers of curvature to right of lens surface, and negative (−) radii for centers to left of lens surface); (3) kappa (the conic constant); (4) and (5) the x and y coordinates, respectively, of axial center of surface with respect to center of exit pupil; (6) the tilt angle y of the surface (positive (+) angles measured counterclockwise from x axis); (7) the lens material; and (8) the clear aperture radius of lens (mm).

TABLE II

| Surface No. | Radius of Curvature (mm) | KAPPA | X | Y | γ (degrees) | Material | Clear Aperture Radius (mm) |
|---|---|---|---|---|---|---|---|
| 166 (exit | ∞ | — | 0 | 0 | 0 | Air | — |

TABLE II-continued

| Surface No. | Radius of Curvature (mm) | KAPPA | X | Y | γ (degrees) | Material | Clear Aperture Radius (mm) |
|---|---|---|---|---|---|---|---|
| pupil) | | | | | | | |
| 168 | 15.33 | −1.645 | 15 | 0 | 0 | Acrylic | 8.5 |
| 170 | −24.74 | −2.58 | 22.62 | 0 | 0 | Air | 8.5 |
| 54 | ∞ | — | 47.33 | 0 | 45° | BK7 | 20.0 |
| 52 | ∞ | — | 48.39 | 1.061 | 45° | Air | 20.0 |
| 162 | −31.98 | — | 57.56 | 0.500 | 0° | BK10 | 7.2 |
| 164 | −26.45 | — | 60.12 | 0.500 | 0° | Mirror | 7.2 |
| 160 | −42.52 | — | 32.65 | 17.46 | 88.21° | LAF21 | 20.0 |
| 158 | −34.88 | — | 32.75 | 20.45 | 88.21° | Air | 20.0 |
| 36 | — | — | 48.83 | 20.50 | 90° | Air | 5.2 |

It should be noted that the beamsplitter coating on surface 52 of dichroic combiner 50 effectively both reflects light from correcting lens 60 to mangin mirror 62, and also transmits the same light, after its reflection by mangin mirror 62, through dichroic combiner 50. This dual function of the beamsplitter coating on dichroic combiner 50 unavoidably produces a certain degree of undesired back reflection to correcting lens 60 and thence to display panel 58. This back reflection causes a degree of ghosting to appear with the superimposed information displayed to the user. This ghosting is not present with the information display optical system 11 of the first embodiment described above. Back reflection is avoided in optical system 11 by the separate uses of the partially mirror coated and the partially uncoated surface 42 of dichroic combiner 28 of FIG. 1. However, due to the off-axis alignment of the optical components of optical system 11 of the first embodiment, optical system 11 suffers from poorer imaging performance than optical system 56 of the second embodiment. Thus, there is a trade-off between improved optical performance and elimination of undesired ghosting when choosing between the first and second embodiments of this invention.

Referring now to FIG. 4, there is shown an optical component layout view for the afocal relay portion of a night vision goggle having an information display optical system 76 according to a third, holographic embodiment of the present invention. Viewing optical system 66 of the third embodiment of this invention is substantially identical to viewing optical system 13 of the first embodiment, except that dichroic combiner 28 is replaced with holographic element 72. As in viewing optical system 13, the collimated light from the collimator assembly of viewing optical system 66 is split by a splitter member into two oppositely directed paths, one for each eyepiece of the goggle. The light reflected by the splitter member is refracted and transmitted by lens 26 to holographic element 72, which performs as a folding mirror with respect to viewing optical system 66. Holographic element 72 reflects the light from lens 26 to lens 32. Lens 32 refracts and transmits the light to the eyes of the user.

Information display optical system 76 comprises a self-luminous display panel 36, as described above with reference to FIG. 1. Light from illuminated display panel 36 is reflected by folding mirror 74 to holographic element 72. Holographic element 72 refracts and transmits the light from display panel 36 into the path of viewing optical system 66, such that the information displayed on display panel 36 is effectively superimposed upon the intensified image of the scene viewed by the user of night vision goggle 10. It should be noted that both the image of the scene transmitted by viewing optical system 66 and the illuminated information transmitted by information display optical system 76 are simultaneously focused at a common image plane 78.

Figure 5:
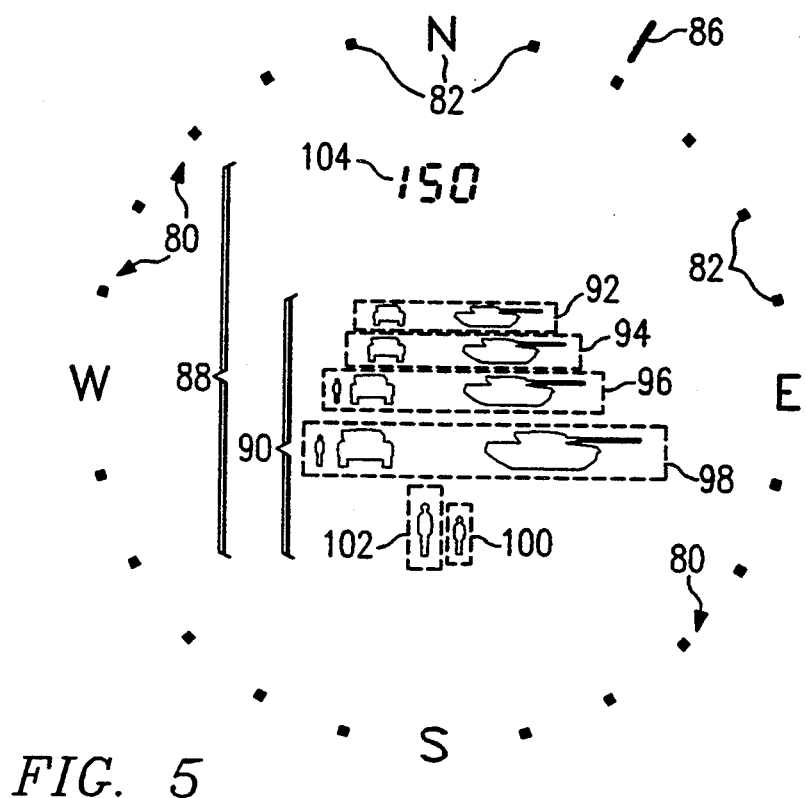
FIG. 5 illustrates the compass heading display 80 and the first stadiametric range reticle display 88 of the present invention.

Referring now to FIG. 5, there are shown two types of alphanumeric and/or graphical information which may be illuminated on display panel 36 and superimposed upon the image of the scene viewed through a night vision goggle or other optical viewing device of this invention. The first type of information shown in FIG. 5 is compass heading display 80. The compass heading information is displayed on display panel 36 in response to an electronic compass 17 when energized through switch 49. As seen in FIG. 5, compass heading display 80 comprises a plurality of illuminated reference marks 82 arranged in a circle near the center of the field of view of the optical viewing device. Compass heading display 80 also includes an illuminated heading mark 86 which is associated with one of the reference marks 82 whereby the association indicates the geographical heading of the viewer. As illustrated in FIG. 5, the reference marks 82 are stationary within the field of view and heading mark 86 varies circularly in position as its association with one of reference marks 82 changes. Alternatively, heading mark 86 could be made stationary within the field of view and reference marks 82 could vary circularly in position as their association with heading mark 86 changes.

As seen in FIG. 5, reference marks 82 include the characters N, S, W, E, representing the geographical directions North, South, West and East, respectively. Preferably, the mark N is located near the top of the field of view, the mark S is located near the bottom of the field of view, the mark W is located near the left side of the field of view, and the mark E is located near the right side of the field of view.

As illustrated, heading mark 86 is a pointer, and moves about the circumference of the viewing area to indicate the compass heading the night vision goggle is directed toward. Heading mark 86 is directed radially toward the center of the field of view and toward reference mark 82 with which it is associated. Although a pointer has been shown for heading mark 86, it is to be recognized that an arrow or a differently shaped mark may be used as an alternative to the illustrated mark 86. The position of the compass heading display 80 is preferably updated by the electronic compass 17 in 500 millisecond to one second intervals.

FIG. 5 also illustrates the first stadiametric range reticle display 88 and the first stadiametric range determining method of the present invention. Stadiametric range reticle display 88 is selectively illuminated on display panel 36 when range data generator 19 is energized through switch 15. Reticle display 88 comprises both range determining information 90 and range distance information 104. Range determining information 90 comprises a plurality of reference marks 92, 94, 96, 98, 100, and 102. Each reference mark 92-102 comprises one or more graphical depictions of a human and/or an armored artillery tank in outline form. As seen, the humans and tanks depicted vary in size among the reference marks 92-102 to correspond with the apparent size of an actual human or tank viewed through the optical viewing device. Reference marks 92, 94, 96, and 98 include depictions of both a front and a side view of a tank for aligning with the corresponding view of the actual tank being viewed. The human symbol is omitted from reference marks 92 and 94 because the scale would be too small to be useful. Although tanks are shown as reference marks in FIG. 5, it is to be understood that any vehicle or other object having a relatively uniform, known dimension may be used as a reference mark in this stadiametric range determining method.

As used in the first range determining method of this invention, knob-operated, multi-position switch 15 is rotated to sequentially display one of the reference marks 92-102 at a time within the field of view by electrically energizing different combinations of the light emitting diodes within display panel 36. For each of the reference marks 92-102, range distance information comprising an appropriate numeric range FIG. 104 is displayed near the top of the field of view by energizing other light emitting diodes within display panel 36. According to the first range determining method of this invention, any one of the reference marks 92-102 is first displayed, and the tank or human symbol, as appropriate, is aligned with the image of an actual tank or human viewed through the optical viewing device. Switch 15 is then rotated to cause range data generate 19 to vary its output to adjust the size of the displayed symbol to most closely match the apparent size of the actual tank or human being viewed. When the displayed symbol most closely matches the object's apparent size, the simultaneously displayed numeric range FIG. 104, indicating the approximate range of the viewed object, is read by the user.

Figure 6:
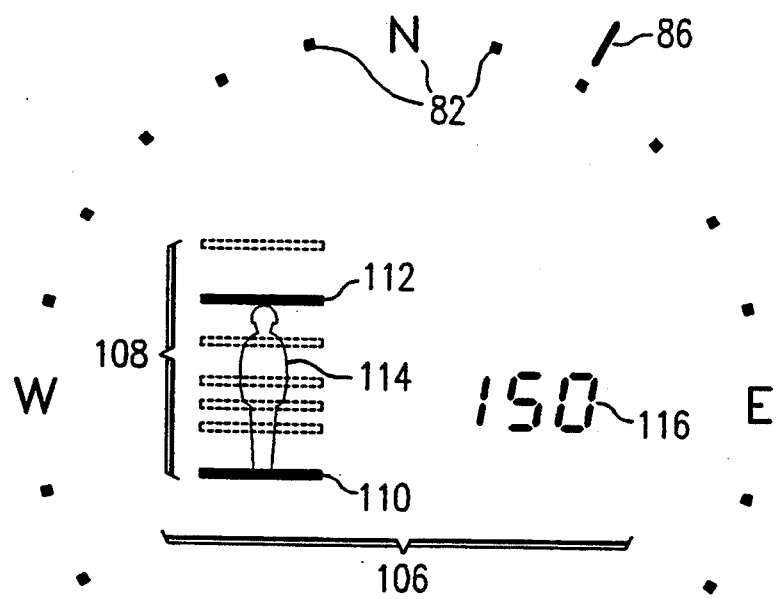
FIG. 6 illustrates the second stadiametric range reticle display 106 of the present invention, together with the compass heading display 80 of FIG. 5.

Referring now to FIG. 6, there is shown the second stadiametric range reticle display 106 of this invention, together with the compass heading display 80 of FIG. 5. Range determining information or reference marks 108 of display 106 comprise a base line 110 which is fixed in position with respect to the field of view, and a cursor line 112 parallel to base line 110. Cursor line 112 varies in position within the field of view such that the distance between cursor line 112 and base line 110 corresponds with an apparent dimension of a viewed object 114. As illustrated in FIG. 6, base line 110 and cursor line 112 are both horizontal with respect to the field of view so that the distance between them corresponds with the apparent height of object 114. Alternatively, base line 110 and cursor line 112 could be vertical with respect to the field of view so that the distance between them would correspond with the apparent length or width of object 114. For each position of cursor line 112, an appropriate numeric range FIG. 116 is displayed. Numeric range FIG. 116 indicates the approximate range of object 114.

As used in the second range determining method of this invention, the user first aligns base line 110 with a first point on the image of the viewed object 114, such as the feet of a human. Multi-position switch 15 is then used to adjust the position of cursor line 112 to most closely align with a second point on the image of object 114, such as the top of the head of the human. The user then determines the approximate range of object 114 by reading displayed numeric range FIG. 116. Although a human is illustrated as object 114 in FIG. 6, it is apparent that a tank or any other object having a generally uniform, known dimension may be used in the second range determining method of this invention.

Figure 7:
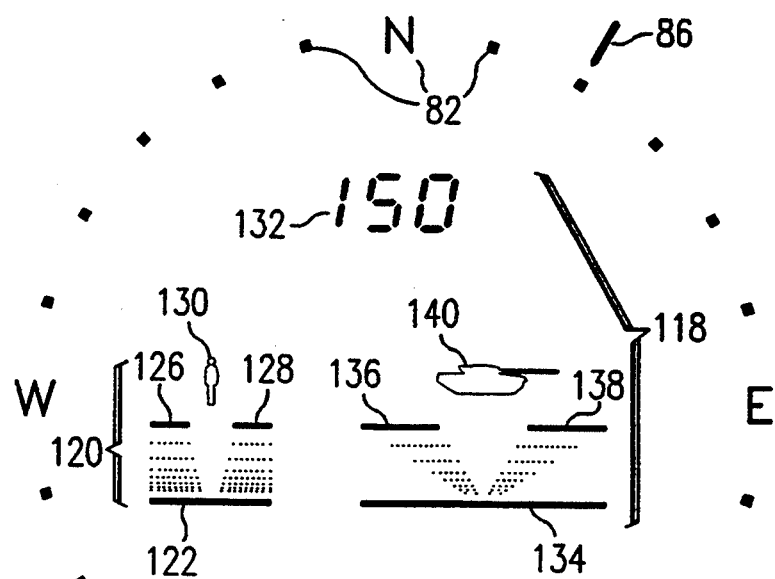
FIG. 7 illustrates the third stadiametric range reticle display 118 of the present invention, together with the compass heading display 80 of FIG. 5.

Referring now to FIG. 7, there is shown the third stadiametric range reticle display 118 of the present invention, together with the compass heading display 80 of FIG. 5. Range determining information or reference marks 120 of display 118 comprise a base line 122 which is fixed in position with respect to the field of view. Parallel to base line 122, and collinear with each other, are a pair of cursor lines 126 and 128. Displayed near cursor lines 126 and 128 is a graphical depiction of an object 130, such as a human. Cursor lines 126 and 128 vary in position within the field of view, such that the distance between cursor lines 126 and 128 correspond with a first apparent dimension of a viewed object (not illustrated), and the distance between either cursor line 126 or 128 and base line 122 corresponds with a second apparent dimension of the viewed object. For each position of cursor lines 126 and 128, an appropriate numeric range FIG. 132 is displayed, which indicates the approximate range of the viewed object.

As used in the third range determining method of this invention, the user first aligns the image of a viewed object corresponding with graphical depiction 130 between cursor lines 126 and 128. Multi-position switch 15 is then used to adjust the spacing between cursor lines 126 and 128 to most closely match the apparent width of the viewed object. Alternatively, the user aligns the image of the viewed object between either cursor line 126 or 128 and base line 122, and multiposition switch 15 is used to adjust the spacing between cursor line 126 or 128 and base line 122 to most closely match the apparent height of the viewed object. The user then reads the displayed numeric range FIG. 132.

As illustrated in FIG. 7, a second base line 134, pair of cursor lines 136 and 138, and graphical depiction 140 of a different object, such as a tank, may also be displayed in display 118 for use in determining the range of a different object viewed through the optical viewing device. Cursor lines 136 and 138 vary in position within the field of view such that the distance between cursor lines 136 and 138 correspond with a first apparent dimension of the object, such as the width of a tank, and the distance between either cursor line 136 or 138 and base line 134 corresponds with a second apparent dimension of the object, such as the height of a tank. In addition, the distance between the opposite ends of cursor lines 136 and 138 may be scaled to correspond with a third apparent dimension of the object, such as the length of a tank.

The present invention, and many of its intended advantages, will be understood from the foregoing description and it will be apparent that, although the invention and its advantages have been described in detail, various changes, substitutions and alterations may be made in the manner, procedure, and details thereof without departing from the spirit and scope of the invention, as defined by the appended claims, or sacrificing all of its material advantages, the form hereinbefore described being merely a preferred or exemplary embodiment thereof.

What is claimed is:

1. An improved optical viewing device of the type having a housing and a viewing optical system supported within the housing for permitting a user to view an image of a scene, wherein the improvement comprises;
   a display panel supported within the housing for displaying visual data when illuminated;
   a mangin mirror supported within the housing;
   a dichroic combiner supported within the housing and disposed in optical proximity to the mangin mirror, the dichroic combiner having a surface which reflects light of wavelengths associated with the viewing optical system and which transmits light of wavelengths associated with the illuminated display panel, whereby the mangin mirror reflects light from the display panel to the dichroic combiner and the dichroic combiner transmits the light into the path of the viewing optical system such that the data display on the display panel is effectively superimposed upon the image of the scene viewed by the user and
   wherein the viewing optical system includes an image intensifying device for producing an intensified image of the scene for permitting night vision, and wherein the data displayed on the display panel is superimposed upon the intensified image of the scene.

2. The improved optical viewing device of claim 1, wherein the dichroic combiner reflects green light associated with the image intensifying device and transmits red light associated with the illuminated display panel.

* * * * *